(12) United States Patent
Kowata

(10) Patent No.: US 10,114,991 B2
(45) Date of Patent: Oct. 30, 2018

(54) READING AND WRITING VERIFICATION DEVICE FOR RFID MEDIUM, AND READING AND WRITING VERIFICATION METHOD FOR SAME

(71) Applicant: SATO HOLDINGS KABUSHIKI KAISHA, Tokyo (JP)

(72) Inventor: Naoki Kowata, Saitama (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/116,938

(22) PCT Filed: Jul. 28, 2014

(86) PCT No.: PCT/JP2014/069841
§ 371 (c)(1),
(2) Date: Aug. 5, 2016

(87) PCT Pub. No.: WO2015/141022
PCT Pub. Date: Sep. 24, 2015

(65) Prior Publication Data
US 2017/0169262 A1   Jun. 15, 2017

(30) Foreign Application Priority Data

Mar. 19, 2014 (JP) ................. 2014-056421

(51) Int. Cl.
*G06K 7/10* (2006.01)
*G06K 1/12* (2006.01)

(52) U.S. Cl.
CPC ........ *G06K 7/10366* (2013.01); *G06K 1/121* (2013.01); *G06K 7/10316* (2013.01)

(58) Field of Classification Search
None
See application file for complete search history.

(56) References Cited

U.S. PATENT DOCUMENTS 6,487,681 B1 * 11/2002 Tuttle ............... G01R 31/01
324/605
8,496,165 B2 * 7/2013 Poole ............... G06K 17/00
235/375

(Continued)

FOREIGN PATENT DOCUMENTS

CN 201965641 U1 9/2011
JP 9-254501 A 9/1997

(Continued)

OTHER PUBLICATIONS

Chinese Office Action, dated Jun. 28, 2018, 11 pages.

*Primary Examiner* — Joseph Feild
*Assistant Examiner* — John Mortell
(74) *Attorney, Agent, or Firm* — Foley & Lardner LLP

(57) ABSTRACT

Focusing on providing a plurality of device antennas along a transfer path of the RFID media, and providing a device antenna for verification, the reading and writing verification device comprises: a data reading and writing unit having a first device antenna, a second device antenna and a third device antenna provided sequentially in the transfer path; and a data verification unit having a fourth device antenna provided on a downstream side of the third device antenna, reading and writing of medium data being made sequentially executable by wireless data communication between the data reading and writing unit and the RFID medium, and in the data verification unit, the medium data being read from the RFID medium to enable verification of the medium data.

18 Claims, 3 Drawing Sheets

(56) References Cited

U.S. PATENT DOCUMENTS

| | | | |
|---|---|---|---|
| 2005/0116034 A1* | 6/2005 | Satake | G06K 17/00 235/432 |
| 2006/0208076 A1 | 9/2006 | Chiu | |
| 2006/0237536 A1* | 10/2006 | Shiigi | G06K 7/10336 235/439 |
| 2007/0119932 A1 | 5/2007 | Sugano et al. | |
| 2007/0216525 A1* | 9/2007 | Toshiaki | G06K 5/02 340/500 |
| 2009/0087243 A1 | 4/2009 | Niiyama | |
| 2013/0161382 A1* | 6/2013 | Bauer | G06K 1/121 235/375 |

FOREIGN PATENT DOCUMENTS

| | | |
|---|---|---|
| JP | 2003-132330 A | 5/2003 |
| JP | 2004-070784 A | 3/2004 |
| JP | 2007-156570 A | 6/2007 |
| JP | 2009-086934 A | 4/2009 |

\* cited by examiner

READING AND WRITING VERIFICATION DEVICE FOR RFID MEDIUM, AND READING AND WRITING VERIFICATION METHOD FOR SAME

TECHNICAL FIELD

The present invention relates to a reading and writing verification device for an RFID medium and a reading and writing verification method for the same, and particularly to a reading and writing verification device for an RFID medium and a reading and writing verification method for the same adapting an RFID (Radio Frequency Identification) technology.

BACKGROUND ART

Conventionally, RFID media such as RFID tags and RFID labels having an IC chip and an RFID antenna and capable of wireless data communication, are used in various management systems by executing reading processing and writing processing of various media data with a device antenna of a reader/writer (RFID medium reading and writing device).

The RFID media is transferred on a transfer path as a band-shaped continuous body including a plurality of the RFID media or as a sheet-shaped member including the plurality of the RFID media, and reading/writing processing (wireless data communication) of the media data is executed at a portion of the device antenna, to allow for high speed processing of the plurality of the RFID media.

However, when the plurality of the RFID media is to be processed at high speed, there is a need to guarantee that handlings against errors occurred in the reading and writing processing will be promptly, appropriately and securely executable.

That is, it is requested to promptly verify whether or not the reading and writing processing was carried out normally, and if by chance an error occurs, it is requested to minimize the occurrence of any problems caused by this error.

PATENT LITERATURE

Patent Literature 1: Japanese Patent Laid-Open No. H9-254501

SUMMARY OF INVENTION

Technical Problem

The present invention was made in view of the aforementioned problems and has an object to provide a reading and writing verification device of an RFID medium and a reading and writing verification method for the same that are capable of promptly verifying whether or not a reading and writing processing of medium data with respect to the RFID medium was carried out normally.

Moreover, the present invention has an object to provide a reading and writing verification device for an RFID medium and a reading and writing verification method for the same that are capable of processing a plurality of RFID media at high speed.

Moreover, the present invention has an object to provide a reading and writing verification device for an RFID medium and a reading and writing verification method for the same that simplifies handlings against errors occurring in the reading and writing processing of the medium data with respect to the RFID medium.

Solution to Problem

That is, the present invention pays an attention to providing a data reading and writing unit on a transfer path of an RFID medium and to providing a data verification unit for medium data verification, and a first invention is a reading and writing verification device for an RFID medium having an IC chip and an RFID antenna and capable of wireless data communication, characterized in that the reading and writing verification device is configured to transfer the RFID medium from an upstream side toward a downstream side along its transfer path of the RFIF medium, the reading and writing verification device including: a data reading and writing unit provided on the transfer path; a printing unit provided on a downstream side of the data reading and writing unit; a data verification unit provided on a downstream side of the printing unit; and an image reading unit provided between the printing unit and the data verification unit, the image reading unit being configured to read print-data printed by the printing unit, the data reading and writing unit being configured to read and write medium data from/onto the RFID medium by the wireless data communication while transferring the RFID medium on the transfer path, the printing unit being configured to print print-data corresponding to the medium data onto the RFID medium, the image reading unit reading the print-data printed onto the RFID medium, and the data verification unit being configured to read the medium data from the RFID medium and verify the medium data.

The second invention is a reading and writing verification method for an RFID medium having an IC chip and an RFID antenna and capable of wireless data communication, characterized in that the reading and writing verification method includes: transferring the RFID medium along its transfer path from an upstream side toward a downstream side; reading and writing of medium data by the wireless data communication between a data reading and writing unit provided on the transfer path and the RFID medium, while transferring the RFID medium on the transfer path; printing, on the RFID medium, print-data printed corresponding to the medium data, in a printing unit provided on a downstream side of the data reading and writing unit; reading the printed data printed on the RFID medium in an image reading unit provided between the printing unit and a data verification unit provided on a downstream side of the printing unit, the image reading unit being configured to read the print-data printed by the printing unit; and reading the medium data from the RFID medium in the data verification unit to perform verification of the medium data.

The data reading and writing unit may have a first device antenna, a second device antenna, and a third device antenna provided sequentially on the transfer path from the upstream side toward the downstream side, and the data verification unit may have a fourth device antenna adapted to read the medium data from the RFID medium.

The RFID medium is supplied to the transfer path in the form that the RFID medium may be arranged in a plurality of rows along a width direction of the transfer path.

The RFID medium is supplied to the transfer path in the form that a plurality of pieces of the RFID medium may be made arranged as one per unit sheet.

The first device antenna may be configured to read a unique identification number of the RFID medium.

The second device antenna may be configured to write the medium data onto the RFID medium.

The third device antenna may be configured to write the medium data onto the RFID medium.

The fourth device antenna may be configured to read the medium data written onto the RFID medium, per unit sheet.

The first device antenna and the second device antenna may be provided by a plural number thereof in line with the number of the plural rows of the RFID medium.

The third device antenna and the fourth device antenna may be provided as a single antenna, and the third device antenna and the fourth device antenna is configured to execute the wireless data communication with each of the RFID media arranged in the plurality of rows.

The print-data printed by the printing unit may include medium display data written on the RFID medium, and medium display data displays the RFID medium in a specifiable manner, by eyesight or in an optical manner.

A plurality of pieces of the RFID medium may be supplied to the transfer path in a form that the RFID medium is arranged as one per unit sheet and the print-data printed by the printing unit may include sheet data that specify each of the unit sheets of the RFID medium.

A plurality of pieces of the RFID medium may be supplied to the transfer path in a form that the RFID medium is arranged as one per unit sheet, and the image reading unit may be configured to read the medium display data printed on the RFID medium by the printing unit per this unit sheet of the RFID media.

A die cutting unit may be provided on a downstream side of the image reading unit.

The die cutting unit can perform die cutting enabling specification of the RFID medium when the reading of the unique identification number of the RFID medium by the first device antenna is not carried out normally.

The die cutting unit can perform die cutting enabling specification of the RFID medium when the writing of the medium data on the RFID medium by the second device antenna or the third device antenna is not carried out normally.

Advantageous Effects of Invention

In the reading and writing verification device for an RFID medium and a reading and writing verification method for the same according to the present invention, a plurality of device antennas (first, second, and third device antennas) for reading and writing medium data is provided along a transfer path of the RFID medium, and also a device antenna (fourth device antenna) is provided for medium data verification. Accordingly, in the transfer path of the RFID medium, not only the reading processing and writing processing of the medium data, but also verification of whether or not this reading and writing processing were carried out normally can be carried out promptly, which thus allows for processing a plurality of the RFID media at high speed.

Moreover, according to the RFID medium reading and writing verification device of the present invention, it is possible to carry out the reading and writing processing of the medium data with respect to the RFID medium more securely and at high speed, and also allows for immediate handling at a time of error occurrence.

Moreover, according to the reading and writing verification method for an RFID medium of the present invention, it is possible to carry out the reading and writing processing of the medium data with respect to the RFID medium more securely and at high speed, and also allows for immediate handlings at a time of error occurrence.

DESCRIPTION OF EMBODIMENTS

The present invention provides a plurality of device antennas for reading and writing medium data, along a transfer path of the RFID medium, and provides a device antenna for medium data verification. This accomplished a reading and writing verification device for an RFID medium and a reading and writing verification method for the same that securely finds an occurrence of an error and simplifies handlings against the error, and that can process a plurality of the RFID media at high speed.

Embodiments

Subsequently, a reading and writing verification device 1 for an RFID medium and a reading and writing verification method for the same according to an embodiment of the present invention will be described on the basis of FIGS. 1 to 3.

Figure 1:
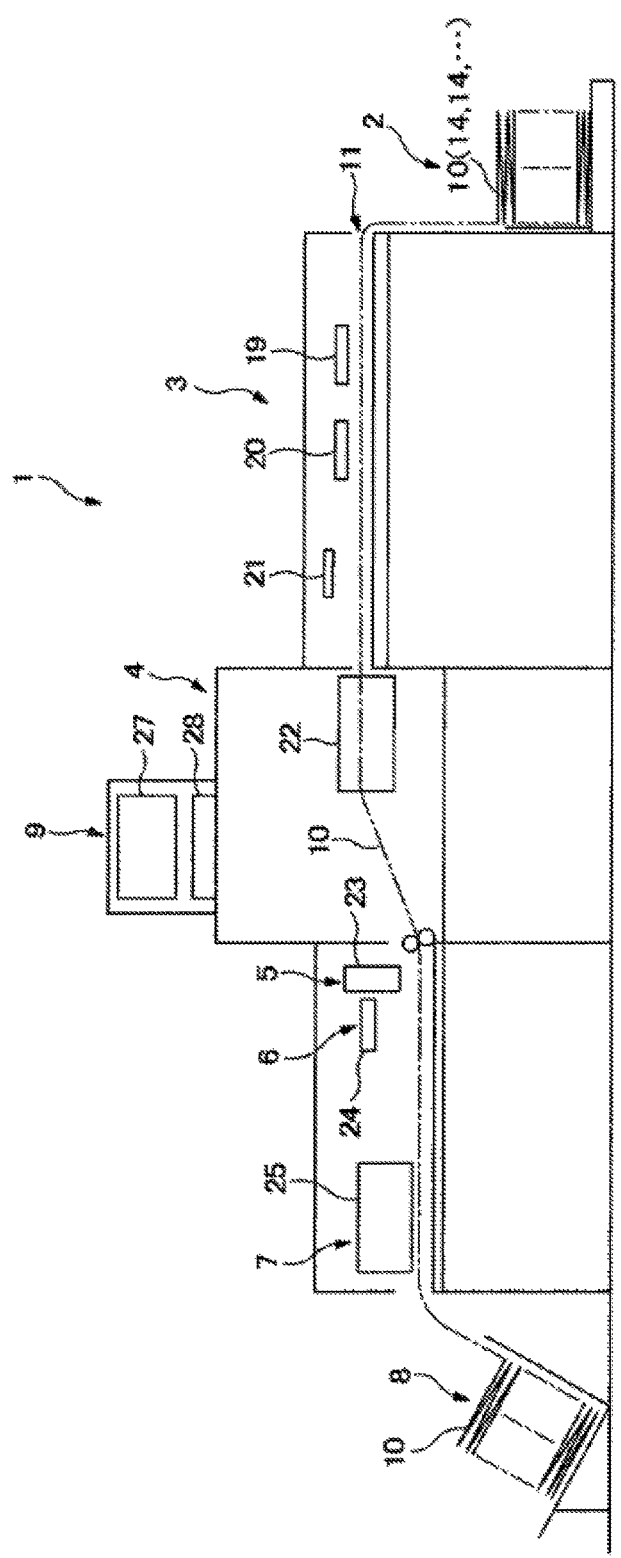
FIG. 1 is a schematic side view of a reading and writing verification device 1 for an RFID medium, according to an embodiment of the present invention.
Figure 2:
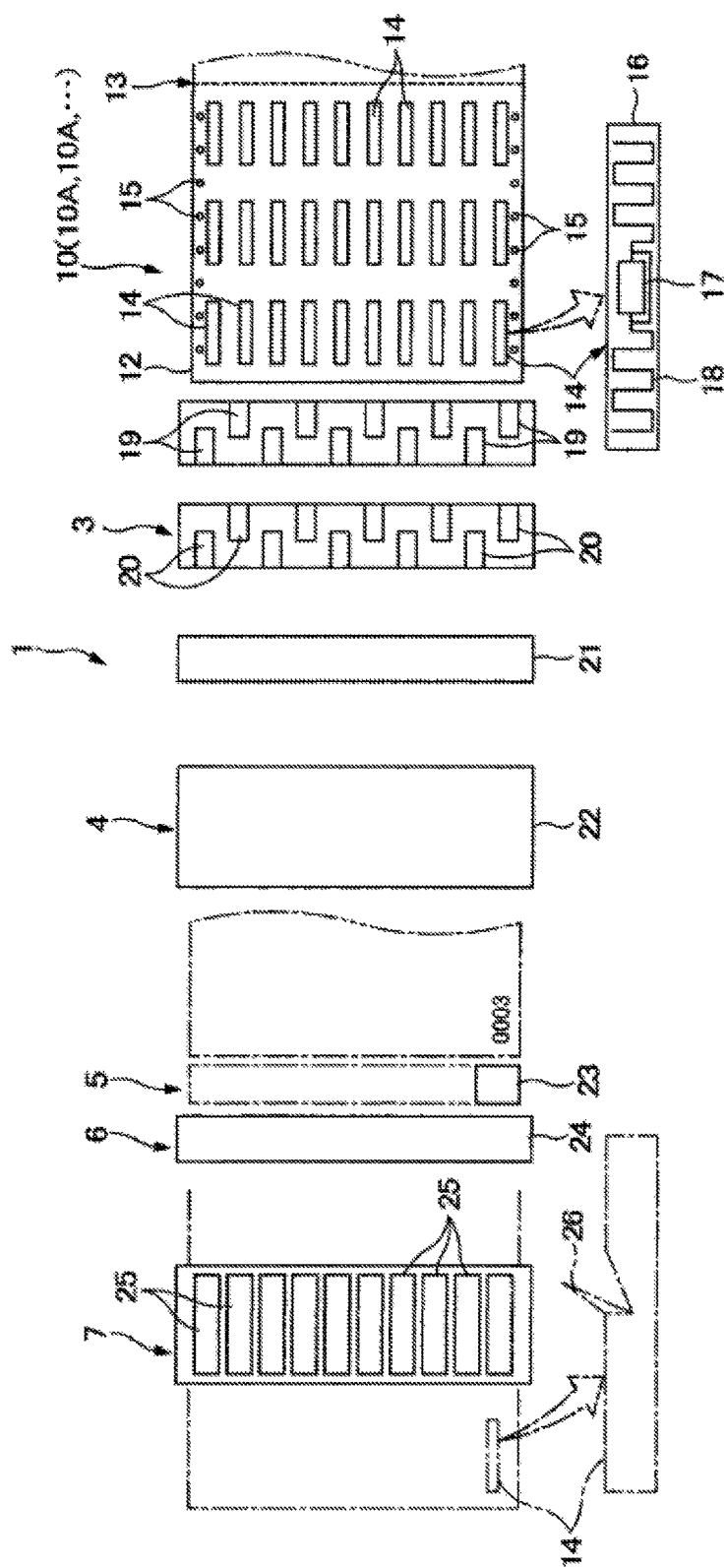
FIG. 2 is a schematic plan view of the reading and writing verification device 1 for the RFID medium, of the above.

FIG. 1 is a schematic side view of the reading and writing verification device 1 for an RFID medium, FIG. 2 is a schematic plan view of the reading and writing verification device 1 for an RFID medium; the reading and writing verification device 1 for an RFID medium includes a supply unit 2, a data reading and writing unit 3, a printing unit 4, an image reading unit 5, a data verification unit 6, a die cutting unit 7, a stacking unit 8, and a control unit 9.

The supply unit 2 keeps an RFID medium continuous paper 10 of a fanfold paper form in a folded and stacked state, and allows for the RFID medium continuous paper 10 to be drawn out to the transfer path 11 in the reading and writing verification device 1 in a band form.

The RFID medium continuous body 10 has perforations 13 formed on a sheet body 12 at predetermined intervals, thus making it possible to separate the RFID medium continuous body 10 into unit sheets 10A, and each of the unit sheets 10A arranges a plurality (lateral ten rows and vertical three lines of pieces, that is, 30 pieces in total in an example illustrated in FIG. 2) of RFID media 14.

Moreover, transfer holes 15 are formed in both right and left edge parts of the sheet body 12 at a predetermined pitch, and a position detection mark (not shown) is printed in advance on its back surface side.

The RFID medium 14 has, as shown in its plan view illustrated in an enlarged manner in a part of FIG. 2, an IC chip 17 provided at a substantially center position on a medium film 16, and an RFID antenna 18 connected to the IC chip 17 and being used in a UHF band (300 MHz to 3 GHz) for example, thus enabling wireless data communication (data reading and writing processing) with the data reading and writing unit 3.

By selecting and designing the IC chip and the RFID antenna as appropriate, it may be made be usable in other frequency bands, such as microwaves (1 to 30 GHz) or HF bands (3 MHz to 30 MHz).

In the illustrated example, the RFID media 14 are in a form in which a plurality thereof are arranged in one unit sheet 10A for each unit sheet 10A and are supplied to the transfer path 11 in this form, however it is also possible to not form the perforations 13 on the RFID medium continuous body 10 (that is, the RFID media 14 may not be in the unit sheets 10A), but be supplied in a continuous band shape member arranged in a plurality of rows along a width direction of the transfer path 11, or supplied to the transfer path 11 each as an independent simple leaf sheet paper.

The transfer path 11 is provided with a transfer mechanism that uses for example sprockets engaging with the transfer holes 15, and a position detection mark sensor (both not illustrated), to make the RFID media 14 (RFID medium continuous body 10) transferred from the upstream side toward the downstream side along the transfer path 11 at a predetermined speed.

The data reading and writing unit 3 has a first device antenna 19, a second device antenna 20, and a third device antenna 21 provided sequentially on the transfer path 11 from the upstream side toward the downstream side, and enables the wireless data communication with the RFID media 14 via reader writers (not illustrated) connected to each of antennas.

The first device antenna 19 is allowed to read a unique identification number designated at a manufacturing stage of each of the RFID media 14.

The second device antenna 20 is provided to of write various object information and product information (not illustrated) to which the RFID media 14 are to be attached and other required medium data, onto the RFID media 14 (IC chip 17).

The third device antenna 21 is similarly provided to write medium data onto the RFID medium 14, and executes the writing operation again in a case in which the writing processing by the second device antenna 20 was not carried out normally.

The first device antenna 19 and the second device antenna 20 are provided in plural numbers (ten in the illustrated example) in line with the plurality of rows of the RFID media 14. However, as shown in FIG. 2, by arranging each of the first device antenna 19 and second device antenna 20 slightly shifted alternately toward the upstream side or downstream side in a transferring direction of the RFID medium continuous body 10 (by arranging in a so-called zig-zag manner), these can be arranged in a compact manner within a limited space.

The third device antenna 21 is provided as a single antenna for wireless data communication with each of the RFID media 14, by covering the plurality of rows of the RFID media 14 from above in the drawing for the entire width direction of the plurality of rows of the RFID media 14.

Thus, the reading and writing of medium data via the wireless data communication is allowed to execute sequentially between the first device antenna 19 and the second device antenna 20 or third device antenna 21 in the data reading and writing unit 3 and the RFID medium 14, while transferring the RFID media 14 on the transfer path 11.

The printing unit 4 is provided on a downstream side of the third device antenna 21, and can employ a printer of any printing type that has a predetermined printing speed, for example a laser printer 22 (or for example an inkjet printer).

The printing unit 4 prints on the RFID medium 14 print-data printed corresponding to medium data to be stored in the IC chip 17 in the RFID medium continuous body 10.

The print-data printed by the printing unit 4 includes medium display data on the RFID medium 14 that displays each of the RFID media 14 in a specifiable manner by eyesight, or optically by a barcode or a two-dimensional code.

Furthermore, in a case in which a plurality of the RFID media 14 is arranged as one per unit sheet 10A and are supplied to the reading and writing verification device 1 (transfer path 11) in this form, the print-data by the printing unit 4 may include sheet data that allows for specifying each of the unit sheets 10A of the RFID media 14 (for example, sheet serial number; "0003" is illustrated as an example in FIG. 2).

The image reading unit 5 is provided on a downstream side of the printing unit 4 and on an upstream side of the data verification unit 6. The image reading unit 5 employs any reading device, for example a CCD camera 23, and enables reading the print-data by the printing unit 4.

That is, the CCD camera 23 is provided to read print-data on the RFID media 14 (medium display data) and print-data on the sheet body 12 of the RFID medium continuous body 10 (sheet data).

By making the CCD camera 23 read at least the sheet data (sheet serial number) among the print-data by the printing unit 4, it will be possible to recognize and manage the medium display data and medium data in association with this sheet data.

Moreover, in a case in which the RFID media 14 are arranged as one per unit sheet 10A (sheet body 12) and is supplied to the reading and writing verification device 1 (transfer path 11) in that form, by providing the CCD cameras 23 (virtual lines in the drawings) by the number of rows of the RFID media 14 (in the illustrated example, ten rows in the width direction of the RFID medium continuous body 10) as the image reading unit 5, this will allow to direct read of the medium display data on the RFID media 14 printed by the printing unit 4 per unit sheet 10A of the RFID media 14, and also allow to verify whether the print-data (medium display data) was printed normally.

The data verification unit 6 has a fourth device antenna 24, and the fourth device antenna 24 is provided as a single antenna for wireless data communication with each of the plurality rows of the RFID media 14.

Moreover, the fourth device antenna 24 is allowed to read the medium data written on the RFID media 14 per unit sheet 10A.

Therefore, this fourth device antenna 24 reads the medium data written on the sheet body 12 to allow to execute of the verification of whether the medium data read matches the medium data that should be read (that is, a verification of whether or not the writing processing of the medium data was carried out normally).

The die cutting unit 7 is provided on a downstream side of the image reading unit 5.

The die cutting unit 7 provides a plurality of incision forming tools 25 in line with the number of the plurality of rows of the RFID media 14 of the RFID medium continuous body 10; by forming an incision on an edge part of an error medium (RFID medium 14) with any incision forming nail for example (not illustrated), on which error medium the reading and writing processing of the print-data or medium data was not carried out normally, a standing piece 26 that stands from an in-plane of the RFID media 14 is formed. The shape and size of this standing piece 26 is optional, and may be formed as a punched hole instead of the standing piece 26.

More specifically, the die cutting unit 7 carries out die cutting enabling the specification of the RFID media 14 in a case in which the reading processing of the unique identification number of the RFID media 14 by the first device antenna 19 is not carried out normally.

Furthermore, the die cutting unit 7 carries out die cutting enabling the specification of the RFID media 14 in a case in which the writing processing of the medium data on the RFID media 14 by the second device antenna 20 or the third device antenna 21 is not carried out normally.

The stacking unit 8 stacks the RFID medium continuous body 10 in a fanfold form, which RFID medium continuous body 10 has completed the processing in each of the data reading and writing unit 3, the printing unit 4, the image reading unit 5, the data verification unit 6, and the die cutting unit 7.

The RFID medium continuous body 10 including the print-data and medium data issued on the stack unit 8 is cut into pieces of the RFID media 14, and the RFID media 14 are attached to predetermined products or managed objects.

The control unit 9 includes a manipulation displaying display 27 and any necessary control circuits 28, and controls each of the aforementioned data reading and writing unit 3, printing unit 4, image reading unit 5, data verification unit 6, and die cutting unit 7.

Figure 3:
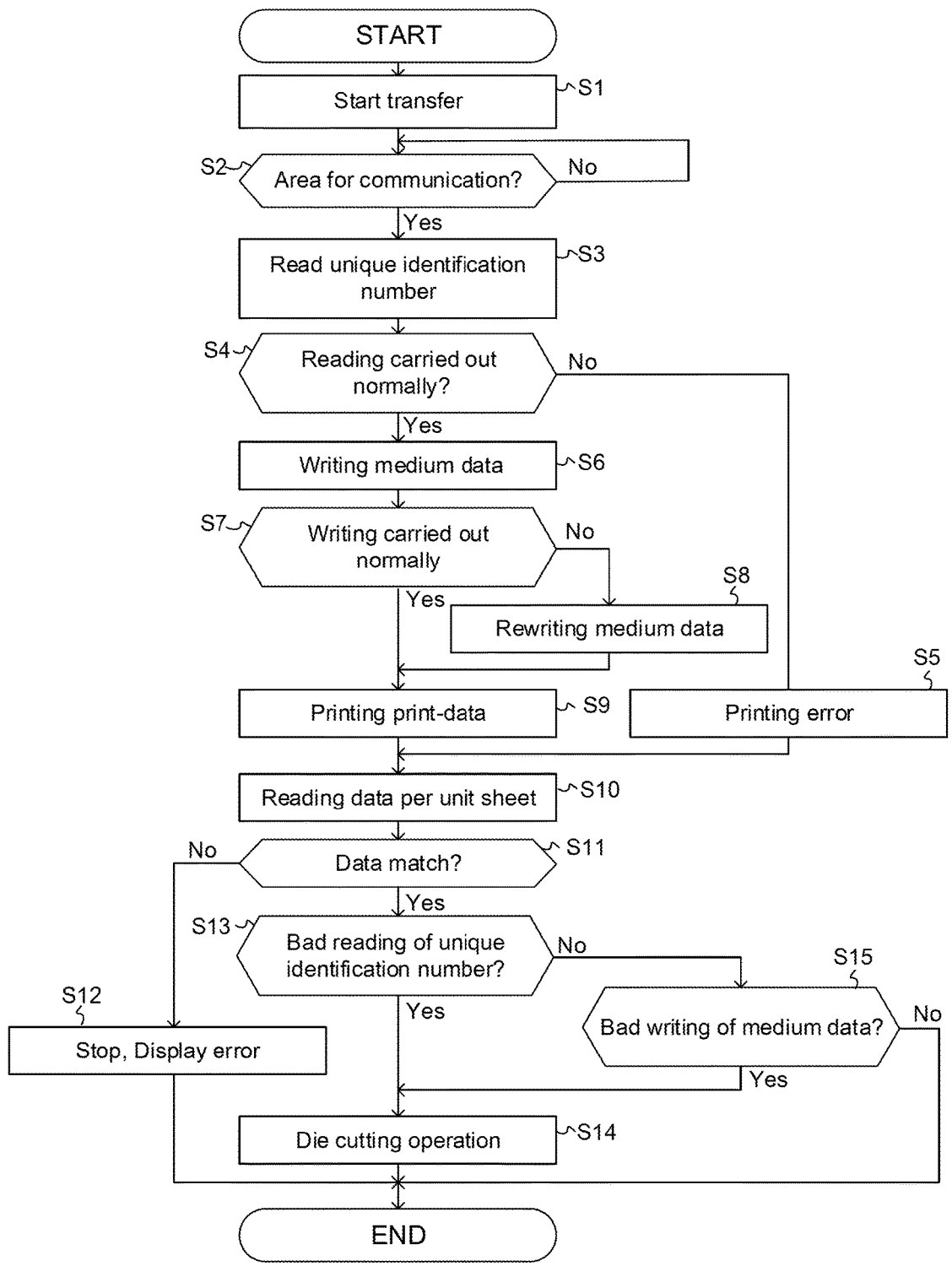
FIG. 3 is a flowchart of a reading and writing verification method of a RFID medium 14, of the above.

A reading and writing verification method for the RFID media 14 by the reading and writing verification device 1 for an RFID medium of such configuration is described on the basis of FIG. 3.

FIG. 3 is a flowchart of the reading and writing verification method for the RFID medium 14 by the reading and writing verification device 1 for an RFID medium. In step S1, transfer of the RFID medium continuous body 10 is started, from the supply unit 2 to the transfer path 11 in the reading and writing verification device 1.

In step S2, it is determined whether the RFID medium continuous body 10 has reached a are for wireless communication in the data reading and writing unit 3, and when it has reached the area for wireless communication, first, in step S3, the first device antenna 19 reads a unique identification number of the RFID medium 14.

In step S4, it is determined whether or not this reading was carried out normally, and if it was not carried out normally, in step S5, an error printing (for example, "error") is carried out by the printing unit 4 on a surface of the RFID medium 14 from which the unique identification number could not be read out.

When the reading of the unique identification number of the RFID medium 14 is determined as carried out normally in step S4, in step S6, medium data is written on the RFID medium 14 (IC chip 17) by the second device antenna 20, and in step S7 it is determined whether or not this writing was carried out normally, and if it was not carried out normally, in step S8 the medium data is re-written by the third device antenna 21.

The next step S9 carries out printing of medium display data by the printing unit 4 (laser printer 22). For example, in a case in which the RFID medium 14 are attached to clothing (not illustrated), the printing unit 4 prints a size of the clothing shown by any letter, number, or drawing pattern and other necessary product data viewable by eyesight, and furthermore optically readable data such as a barcode or two-dimensional codes.

Moreover, the printing unit 4 prints sheet data (for example, sheet serial number; FIG. 2 illustrates "0003" as one example) on each of the unit sheets 10A (sheet body 12) of the RFID medium continuous body 10.

Furthermore in step S10, medium data is read per unit sheet 10A of the RFID medium continuous body 10.

That is, the CCD camera 23 of the image reading unit 5 reads and recognizes the sheet serial number (sheet data) printed by the printing unit 4, and reads out the medium data written on each of the RFID media 14 of the RFID medium continuous body 10 managed by this sheet serial number.

Next, in step S11, the medium data from the RFID medium 14 by the fourth device antenna 24 is read out in the data verification unit 6, and is determined whether the medium data of each of the RFID media 14 of the RFID medium continuous body 10 managed by the sheet serial number matches the read medium data.

When the written medium data and the read medium data do not match each other, in step S12, the transfer of the reading and writing verification device 1 for an RFID medium is stopped, being determined as that the writing processing was not carried out normally, and necessary error warnings are performed on the manipulation displaying display 27 while allowing for any required handlings to be instructed. For example, the RFID medium continuous body 10 may be removed from the transfer path 11 of the reading and writing verification device 1 and again be transferred thereon, to carry out the reading and writing processing as described above again, or the unit sheet 10A including the RFID medium 14 to which the normal writing processing was not carried out is cut off at the perforation 13.

When the data matches in step S11, in step S13, it is determined whether or not there was a bad reading of the unique identification number of the RFID media 14 by the first device antenna 19; if there was a bad reading, in step S14, a die cutting operation is performed to this RFID medium 14 by the incision forming tool 25, and by forming the standing piece 26 on the RFID medium 14, this clearly shows that this RFID medium 14 is unable to be used.

When there is no bad reading of the unique identification number, in step S15, on the basis of the data matching determination results in step S13, it is determined whether there was bad writing of the medium data, and if there was a bad writing, in the aforementioned step S14, the die cutting operation is performed to this RFID medium 14 by the incision forming tool 25, and by forming the standing piece 26 on the RFID medium 14, this clearly shows that this RFID medium 14 is unable to be used. If there is no error, this flow terminates.

As such, the RFID media 14 are transferred along its transfer path 11 from an upstream side toward a downstream side, and while transferring the RFID medium 14 on the transfer path 11 that sequentially provides the first device antenna 19 and the second device antenna 20 or third device antenna 21 from the upstream side to the downstream side of the transfer path 11, the reading and writing of the medium data are executed sequentially by the wireless data communication between the RFID medium 14 and the first device antenna 19 and the second device antenna 20 or third device antenna 21; in the printing unit 4, print-data corresponding to this medium data is printed on the RFID media 14, in the image reading unit 5, the print-data (medium display data, sheet data) is read, in the fourth device antenna 24 in the data verification unit 6, the medium data is read and verification thereof is performed, and in the die cutting unit 7, a standing piece 26 is formed for bad RFID media 14, to facilitate classification.

Therefore, together with the transfer of the RFID medium continuous body 10 in the transfer path 11, reading and writing of medium data and display of the print-data are performed, and verification by the image reading unit 5 and the data verification unit 6 are configured to execute, to enable immediate and accurate determination of an error in the reading and writing of the data.

Furthermore, by supplying and processing the RFID medium continuous body 10 as a plurality of pieces of unit sheets 10A arranging a plurality of the RFID media 14, it is possible to process at high speed and at bulk amounts, and enables the handling per unit sheet 10A when an error occurs.

REFERENCE SIGNS LIST 1 reading and writing verification device for an RFID medium (Embodiments, FIG. 1, FIG. 2)
2 supply unit
3 data reading and writing unit
4 printing unit
5 image reading unit
6 data verification unit
7 die cutting unit
8 stacking unit
9 control unit
10 RFID medium continuous body
10A unit sheet of RFID medium continuous body 10
11 transfer path
12 sheet body
13 perforation
14 RFID medium (media)
15 transfer holes
16 medium film
17 IC chip
18 RFID antenna
19 first device antenna
20 second device antenna
21 third device antenna
22 laser printer
23 CCD camera
24 fourth antenna
25 incision forming tool
26 standing piece
27 manipulation displaying display
28 control circuit

The invention claimed is:

1. A reading and writing verification device for an RFID medium having an IC chip and an RFID antenna and capable of wireless data communication, wherein the reading and writing verification device is configured to transfer the RFID medium from an upstream side toward a downstream side along a transfer path of the RFID medium, the reading and writing verification device comprising:
a data reader-writer provided on the transfer path;
a printer provided on a downstream side of the data reader-writer;
a data verifier provided on a downstream side of the printer; and
an image reader provided between the printer and the data verifier,
wherein the RFID medium is arranged on an RFID medium continuous body comprising a plurality of unit sheets,
wherein the data reader-writer is configured to read and write medium data from/onto the IC chip of the RFID medium by the wireless data communication while the RFID medium is transferred on the transfer path,
wherein the printer is configured to print a sheet number on a surface of a unit sheet of the plurality of unit sheets that identifies the unit sheet, the sheet number being associated with the medium data written onto the IC chip of the RFID medium arranged on the unit sheet,
wherein the image reader is configured to read the sheet number printed on the surface of the unit sheet, and
wherein the data verifier is configured to determine whether the medium data associated with the sheet number read by the image reader matches the medium data written onto the IC chip of the RFID medium arranged on the unit sheet.

2. The reading and writing verification device for an RFID medium according to claim 1,
wherein the data reader-writer has a first device antenna, a second device antenna, and a third device antenna, provided sequentially on the transfer path from the upstream side toward the downstream side, and
wherein the data verifier has a fourth device antenna adapted to read the medium data from the RFID medium.

3. The reading and writing verification device for an RFID medium according to claim 1,
wherein the RFID medium is supplied to the transfer path in a form that the RFID medium is arranged in a plurality of rows along a width direction of the transfer path.

4. The RFID medium reading and writing verification device according to claim 1,
wherein a plurality of RFID media are supplied to the transfer path in a form that one RFID medium is arranged per unit sheet.

5. The reading and writing verification device for an RFID medium according to claim 2,
wherein the first device antenna is configured to read a unique identification number of the RFID medium.

6. The reading and writing verification device for an RFID medium according to claim 2,
wherein the second device antenna is configured to write the medium data onto the RFID medium.

7. The reading and writing verification device for an RFID medium according to claim 2,
wherein the third device antenna is configured to write the medium data onto the RFID medium.

8. The reading and writing verification device for an RFID medium according to claim 4,
wherein the fourth device antenna is configured to read the medium data written onto the RFID medium, per unit sheet.

9. The reading and writing verification device for an RFID medium according to claim 3,
wherein the first device antenna and the second device antenna are provided by a plural number thereof in line with the number of the plural rows of the RFID medium.

10. The reading and writing verification device for an RFID medium according to claim 3,
wherein a third device antenna and a fourth device antenna are provided as a single antenna, and the third device antenna and the fourth device antenna is configured to execute the wireless data communication with each of RFID media arranged in the plurality of rows.

11. The reading and writing verification device for an RFID medium according to claim 1,
wherein the sheet number printed by the printer is displayed in a specifiable manner, by eyesight or in an optical manner.

12. The reading and writing verification device for an RFID medium according to claim 2, further comprising a die cutter provided on a downstream side of the image reader.

13. The reading and writing verification device for an RFID medium according to claim 12,
wherein the die cutter is configured to perform die cutting so as to specify the RFID medium when the first device antenna does not read a unique identification number of the RFID medium normally.

14. The reading and writing verification device for an RFID medium according to claim 12,
wherein the die cutter is configured to perform die cutting so as to specify the RFID medium when the second device antenna or the third device antenna does not write the medium data on the RFID medium normally.

15. A reading and writing verification method for an RFID medium having an IC chip and an RFID antenna and capable of wireless data communication, the method comprising:
transferring the RFID medium along a transfer path from an upstream side toward a downstream side, the RFID medium being arranged on an RFID medium continuous body comprising a plurality of unit sheets;
reading and writing medium data via the wireless data communication between a data reader-writer provided on the transfer path and the IC chip of the RFID medium, while transferring the RFID medium on the transfer path;
printing a sheet number on a surface of a unit sheet of the plurality of unit sheets that identifies the unit sheet, the sheet number being associated with the medium data written onto the IC chip of the RFID medium arranged on the unit sheet, via a printer provided on a downstream side of the data reader-writer;
reading the sheet number printed on the surface of the RFID medium, via an image reader provided between the printer and a data verifier provided on a downstream side of the printer; and
performing verification of the medium data, via the data verifier, by reading the medium data from the IC chip of the RFID medium and determining whether the medium data associated with the sheet number read by the image reader matches the medium data written onto the IC chip of the RFID medium arranged on the unit sheet.

16. A reading and writing verification device for RFID media, each RFID medium having an IC chip and an RFID antenna and capable of wireless data communication, wherein the reading and writing verification device is configured to transfer the RFID media from an upstream side toward a downstream side along a transfer path of the RFID media, the reading and writing verification device comprising:
a data reader-writer provided on the transfer path;
a printer provided on a downstream side of the data reader-writer;
a data verifier provided on a downstream side of the printer; and
an image reader provided between the printer and the data verifier,
wherein the RFID media are arranged on an RFID medium continuous body comprising a plurality of unit sheets, and each of the plurality of unit sheets has a plurality of RFID media arranged thereon,
wherein the data reader-writer is configured to read and write medium data from/onto IC chips of the RFID media arranged on the unit sheet by the wireless data communication while the RFID medium continuous body is transferred on the transfer path,
wherein the printer is configured to print a sheet number on a surface of a unit sheet of the plurality of unit sheets that identifies the unit sheet, the sheet number being associated with the medium data written onto the IC chips of the plurality of RFID media arranged on the unit sheet,
wherein the image reader is configured to read the sheet number printed on the surface of the unit sheet, and
wherein the data verifier is configured to determine whether the medium data associated with the sheet number read by the image reader matches the medium data written onto the IC chips of the plurality of RFID media arranged on the unit sheet.

17. The reading and writing verification device for an RFID medium according to claim 1, wherein the image reader comprises a camera.

18. The reading and writing verification device for an RFID medium according to claim 17, wherein the camera comprises a CCD camera.

* * * * *